United States Patent
Cirielli (10) Patent No.: US 7,353,134 B2
(45) Date of Patent: *Apr. 1, 2008

(54) THREE-DIMENSIONAL POSITION AND MOTION TELEMETRY INPUT

(75) Inventor: Dean A. Cirielli, 61 Arlington St., Winchester, MA (US) 01890

(73) Assignee: Dean A. Cirielli, Winchester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/656,600

(22) Filed: Jan. 23, 2007

(65) Prior Publication Data

US 2007/0213952 A1 Sep. 13, 2007

Related U.S. Application Data

(63) Continuation of application No. 11/371,443, filed on Mar. 9, 2006, now Pat. No. 7,188,045.

(51) Int. Cl.
*G06F 15/00* (2006.01)
*G09G 5/00* (2006.01)

(52) U.S. Cl. .................. 702/152; 702/150; 345/166

(58) Field of Classification Search ........... 702/150, 702/152, 189, 190; 345/158, 165, 166; 340/870.11, 340/870.21; 178/18.04, 19.07; 250/339.06, 250/370.09

See application file for complete search history.

(56) References Cited

U.S. PATENT DOCUMENTS

| | | | |
|---|---|---|---|
| 5,757,360 A | 5/1998 | Nitta et al. | |
| 5,847,710 A | 12/1998 | Kroitor | |
| 5,875,257 A | 2/1999 | Marrin et al. | |
| 6,380,732 B1 | 4/2002 | Gilboa | |
| 6,441,770 B2 * | 8/2002 | Russell | 341/176 |
| 6,738,044 B2 | 5/2004 | Holzrichter et al. | |
| 6,791,531 B1 | 9/2004 | Johnston et al. | |
| 6,801,231 B1 | 10/2004 | Beltz | |
| 2004/0001570 A1 * | 1/2004 | Kuroda et al. | 378/207 |
| 2004/0004601 A1 | 1/2004 | Wu | |

FOREIGN PATENT DOCUMENTS

GB EP 1 035 481 9/2000

* cited by examiner

*Primary Examiner*—Bryan Bui
(74) *Attorney, Agent, or Firm*—Sampson & Associates P.C.

(57) ABSTRACT

A three-dimensional position and motion telemetry computer input apparatus includes a wireless movable element configured to repeatedly transmit encoded signals in at least three mutually distinct directions. A set of at least three unidimensional signal detectors are disposed in spaced relation to one another and configured to repeatedly detect in real-time, the amplitude of the encoded signals incident thereon. A controller is configured to repeatedly capture data corresponding to the signal amplitude, in real-time. A calculation engine repeatedly determines the 3-D position of the movable element using the captured data. At least one output port coupled to the calculation engine, repeatedly transmits the 3-D position of the movable element to a data consumer in real time.

23 Claims, 11 Drawing Sheets

THREE-DIMENSIONAL POSITION AND MOTION TELEMETRY INPUT

RELATED APPLICATION

This application claims priority, and is a Continuation of co-pending U.S. patent application Ser. No. 11/371,443 (U.S. Pat. No. 7,188,450) entitled Three-Dimensional Position and Motion Telemetry Input, filed on Mar. 9, 2006, the contents of which are incorporated herein by reference in their entirety for all purposes.

BACKGROUND

1. Technical Field

This invention relates to input devices for computers and the like, and more particularly to a system and method for providing 3-D input in real time.

2. Background Information

Throughout this application, various publications, patents and published patent applications are referred to by an identifying citation. The disclosures of the publications, patents and published patent applications referenced in this application are fully incorporated by reference into the present disclosure.

A wide variety of devices are capable of wirelessly controlling the movement of a cursor or other on-screen display element. For example, U.S. Pat. Nos. 5,847,710 and 6,380,732 both disclose systems capable of capturing the 3-D position of a passive (unpowered) implement by generating electro-magnetic (EM) fields, and then detecting disruptions therein caused by movement of the that EM fields are susceptible to interference, and may generate unwanted interference. Other approaches, such as disclosed in U.S. Pat. Nos. 6,791,531, and 6,738,044 disclose systems that also utilize passive implements, but without the need to generate EM fields. Rather, these systems rely on reflective schemes, in which the position of the implement is determined by transmitting a signal towards the implement, and then measuring characteristics of the signal reflected therefrom. These patents, however, are relatively complex, may be susceptible to slight changes in reflection angle, and do not teach the capture of 3-D position data.

U.S. Pat. No. 5,757,360 and EP 1,035,481 both disclose active implements, i.e., powered implements that directly transmit signals. These references, however, rely on the use of accelerometers, and as such, are only capable of indirectly determining position, which tends to adversely affect accuracy thereof. For example, indirect methods that rely on a previously calculated measurement, can drift further and further from their actual value simply due to digital math approximation error.

U.S. Pat. Nos. 5,875,257 and 6,801,231 (the '257 and '231 patents) disclose systems intended to capture the position of an active implement that transmits signals which are then detected by stationary detectors. The '257 patent uses one or more lenses and Position Sensitive Photodiodes (PSDs), devices which inherently detect and report two-dimensional position data of light spots or distributions incident on their detecting surfaces, and does not teach the manipulation of on-screen objects such as cursors and the like, while the '231 patent triangulates ultrasonic signals received at three distinct locations, projecting them to derive 2-D planar position data for controlling an onscreen computer cursor.

Thus, a need exists for a system and method for directly determining the 3-D position of a computer input device in real time.

SUMMARY

An aspect of the invention includes a three-dimensional position and motion telemetry computer input apparatus. The apparatus includes a user-engagable movable element and a combination of at least one transmitter and at least one signal detector configured to repeatedly transmit and receive signals between the movable element and at least three mutually distinct spaced locations. A discriminator is coupled to the signal detector to repeatedly distinguish the signals from other signals. The signal detector is configured to detect, in real time, characteristics of the signals corresponding to distances between the movable element and the three mutually distinct spaced locations. An analog to digital converter is configured to repeatedly digitize, in real-time, signal data corresponding to the distances detected by the signal detector. A controller is configured to repeatedly capture, in real-time, the digitized signal data. A calculation engine is configured to repeatedly determine the 3-D position of the movable element, in real-time, by trilaterating the captured signal data; and at least one output port coupled to the calculation engine, is configured to repeatedly transmit the 3-D position of the movable element to a computer in real-time.

Another aspect of the invention includes a three-dimensional position and motion telemetry computer input apparatus. This aspect includes a user-engagable movable element and a combination of at least one transmitter and at least one signal detector configured to repeatedly transmit and receive signals between the movable element and at least three mutually distinct spaced locations. The at least one signal detector is configured to repeatedly detect in real-time, characteristics of the signals corresponding to distances between the movable element and the at least three mutually distinct spaced locations. A calculation engine is configured to repeatedly determine, in real-time, the 3-D position of the movable element using the signal characteristics. At least one output port coupled to the calculation engine, repeatedly transmits the 3-D position of the movable element to a data consumer in real time.

A still further aspect of the invention includes a method for inputting real-time three-dimensional position and motion telemetry data to a computer. This method includes providing a user engagable movable element; and transmitting and receiving repeatedly in real-time, signals between the movable element and at least three mutually distinct locations. The method also includes repeatedly detecting in real-time, characteristics of the signals corresponding to distances between the movable element and the at least three mutually distinct spaced locations. The signal characteristics are used to determine the 3-D position of the movable element in real time. The 3-D position is repeatedly transmitted in real-time to a data consumer.

BRIEF DESCRIPTION OF THE DRAWINGS

The above and other features and advantages of this invention will be more readily apparent from a reading of the following detailed description of various aspects of the invention taken in conjunction with the accompanying drawings, in which.

DETAILED DESCRIPTION

In the following detailed description, reference is made to the accompanying drawings that form a part hereof, and in which are shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings are indicated with like reference numerals and similar features as shown in alternate embodiments in the drawings are indicated with similar reference numerals.

Embodiments of the present invention include a three-dimensional position telemetry computer input device in the form of a wand, stylus or other convenient form factor. These input devices include an embedded transmitter which emits a distinguishable wireless (e.g., pulsed or otherwise encoded IR) signal receivable by at least three spaced uni-dimensional signal detectors. The detectors measure the strength of signals received from the transmitter device, which are filtered to eliminate background noise. The received signal strength is then used to determine the three-dimensional (3-D) position of the device in real-time. The 3-D position may then be displayed on a computer screen or similarly used by other data consumers.

In particular embodiments, the 3-D position is obtained by correlating the received signal strengths to distances from the signal detectors disposed at known positions. Distances from at least three detectors may then be used to directly calculate the 3-D coordinate position without calculating angles or using planar geometric projection, etc., such as commonly used in conventional 2-D triangulation approaches. These embodiments thus determine 3-D position coordinates directly from distance measurements, and thereby eliminate drift and compounding errors associated with conventional indirect methods and/or compounded 2-D position measurements. That is, all measurements will be within the measuring system's margins of error; as additional measurements are taken, they will all naturally remain within the measuring system's margins of error. Since there is no tracking, that is no deriving position by keeping track of all motions away from a starting point, there are also no compounding digitization or compounding binary approximation errors.

This use of direct measurement and/or pulsed or encoded optical signals overcomes interference from ambient radiation which is significantly more problematic with 3-D measurement than with 2-D systems since, as compared to more forgiving triangulated projections used for 2-D coordinates only, finer scale measurements with substantially lower margins of error are required to derive a similarly accurate third dimension from the same signals.

Moreover, these embodiments do not require advanced signal processing, which facilitates manufacture thereof. They also tend to be more robust and more convenient for consumer use as there is no need to surround the field of motion with relatively complex, and potentially dangerous, field generation coils and the like.

These embodiments thus enable the 3-D position of a hand-held computer input device to be determined efficiently by the use of active, encoded transmission, in combination with three or more relatively simple, uni-dimensional signal detectors.

Where used in this disclosure, the term "computer" is meant to encompass a workstation, person computer, personal digital assistant (PDA), wireless telephone, or any other device having an embedded processor, such as a gaming console, analytical instrument, other computing device, or analog or digital electronic device. The term "network" refers to one or more local area networks (LANs), metropolitan area networks (MANs), wide area networks (WANs), a portion of the global computer network known as the Internet, or any other appropriate wireline, wireless, or other links. The components of the embodiments disclosed herein may operate on one or more term "real time" refers to operations that are effected nominally instantaneously or within several seconds.

Figure 1:
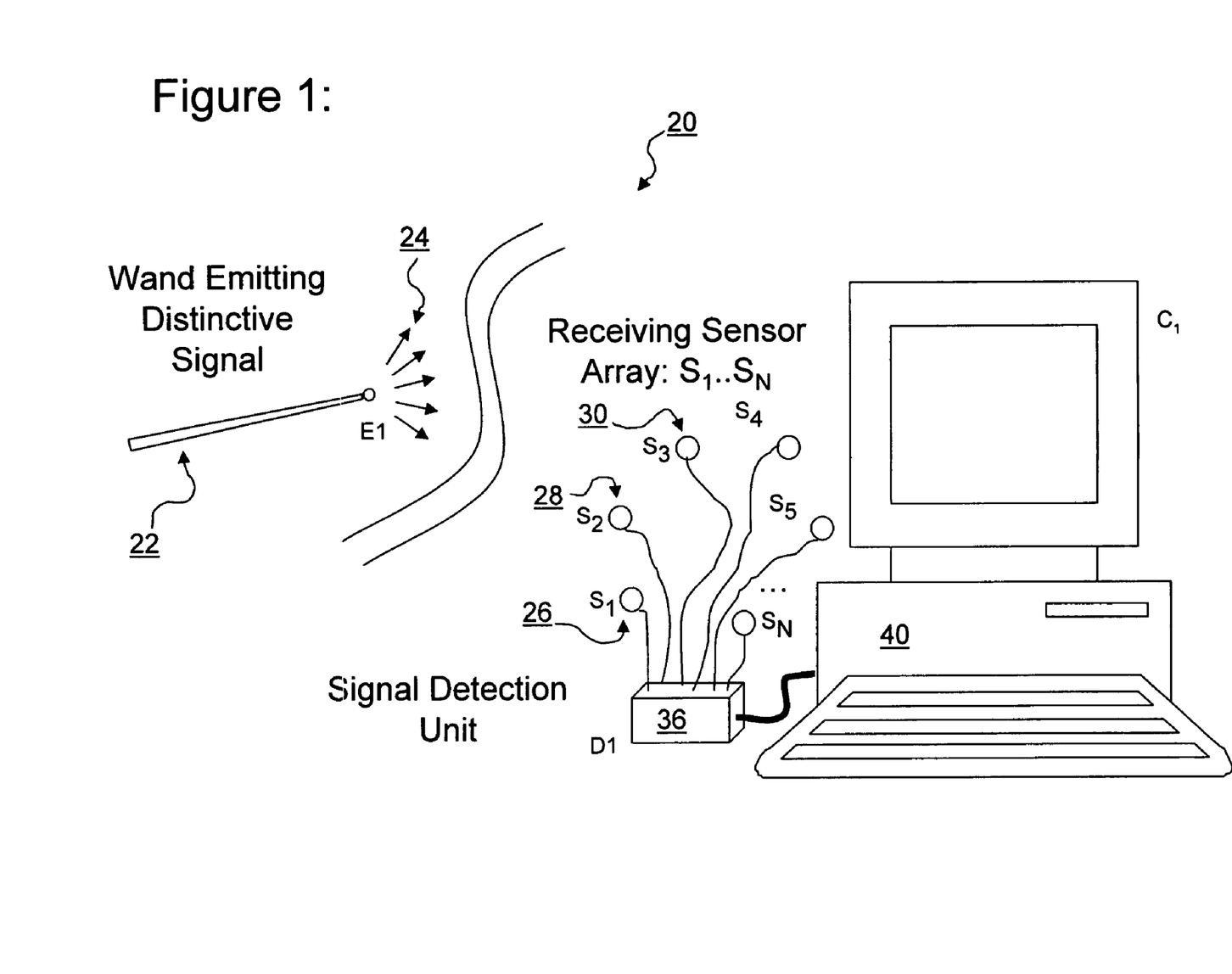
FIGS. 1-3 are schematic representations of systems incorporating embodiments of the present invention.
Figure 2:
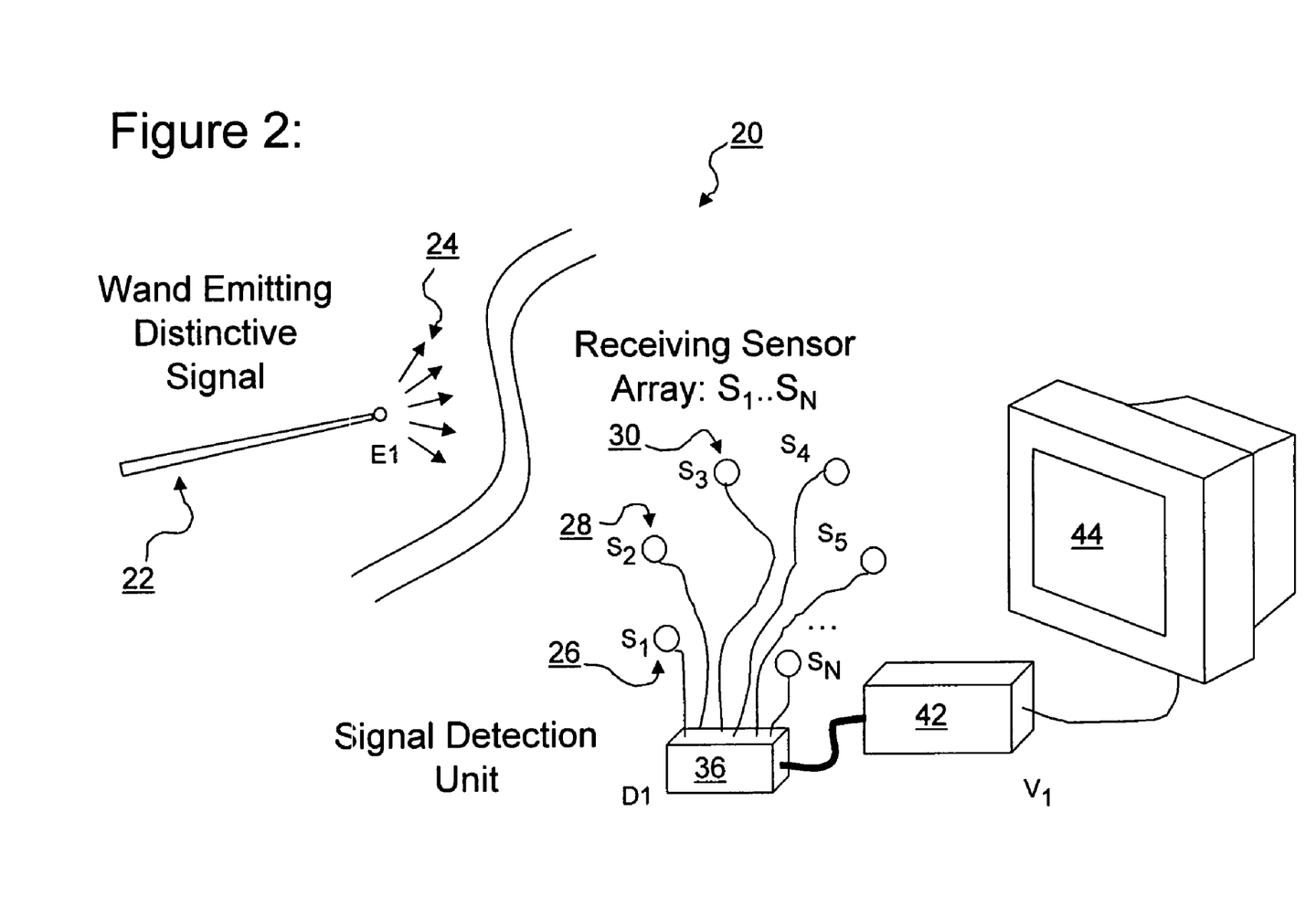
Figure 3:
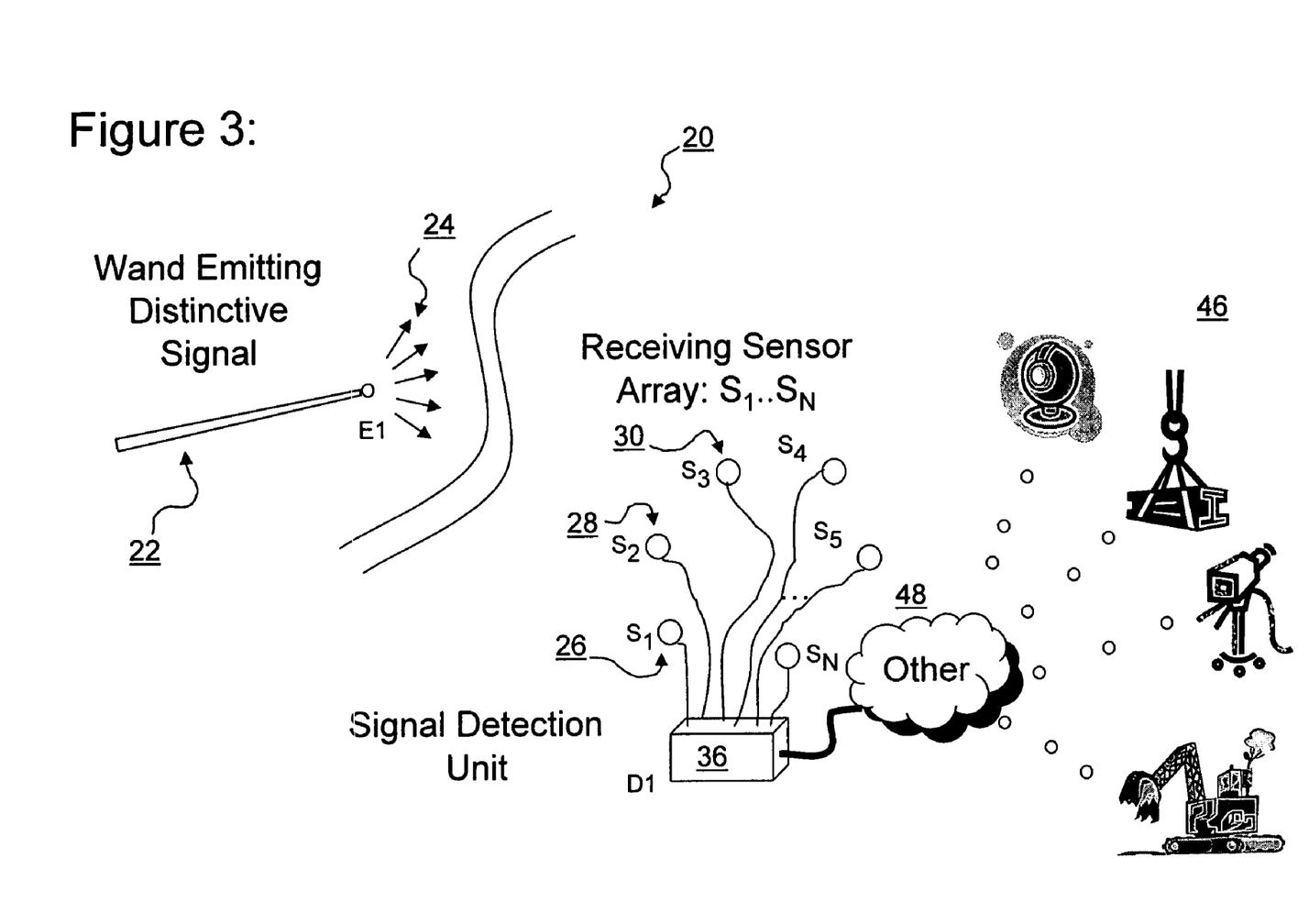

Turning now to the Figs., embodiments of the present invention will be described in greater detail. As shown in FIGS. 1-3, an exemplary telemetry input system 20 includes a transmitter device 22 in the form of a wand or stylus configured to wirelessly transmit a predetermined multidirectional (e.g., broadly dispersed) signal 24. The signal 24 is sufficiently multidirectional to be transmitted in at least three mutually distinct directions, such as to be received by a set of at least three spaced uni-dimensional sensors 26, 28, 30, etc. (e.g. sensors which, in contrast with CCD cameras and PSDs, are incapable of meaningfully reporting their measurements as functions of spatial coordinates on their own). The sensors may thus advantageously be relatively simple devices, which merely detect the strength (e.g., amplitude, as discussed hereinbelow) of signal 24 at a point. The sensors are communicably coupled to a signal detection unit (e.g., controller) 36, which is coupled to the data consumer. The data consumer may include a personal computer 40 (FIG. 1), a video game 42, e.g., coupled to a television 44 (FIG. 2), or nominally any other device(s) 46, including one or more computer and videoconferencing cameras, cranes, video cameras, or industrial equipment, and the like, which may be coupled to signal detection unit 36 by the Internet, other network 48 (FIG. 3), or other analog or digital circuitry.

In particular embodiments, signal 24 is a multidirectional pulsed optical e.g., Infrared (IR) signal. Although nominally any other signal type may be used, including Radio Frequency (RF), Visible Light, ultrasonic, audible sonic, etc., and combinations thereof; a distinguishable (e.g., pulsed or encoded) IR signal may be advantageous in some applications to avoid interference with or by other nearby RF signals. Those skilled in the art will recognize that RF signals such as those within spectrum commonly used for many home and business applications, such as for wireless (e.g., WiFi) networks and the like, may be used. However, as IR is limited to line of sight applications (being unable to pass through opaque objects such as walls) its use may be desirable, such as to avoid interference issues with other nearby RF applications, including the aforementioned WiFi networks, cordless telephones, and cell phones, etc. Use of this optical signal type tends to aid detection by sensors 26, 28, etc., since these sensors will not be adversely affected by the aforementioned ambient RF signals found in many locations. Whichever signal type is used may use conventional amplitude modulation and/or frequency modulation or other methods to create a distinguishable signal.

Figure 4:
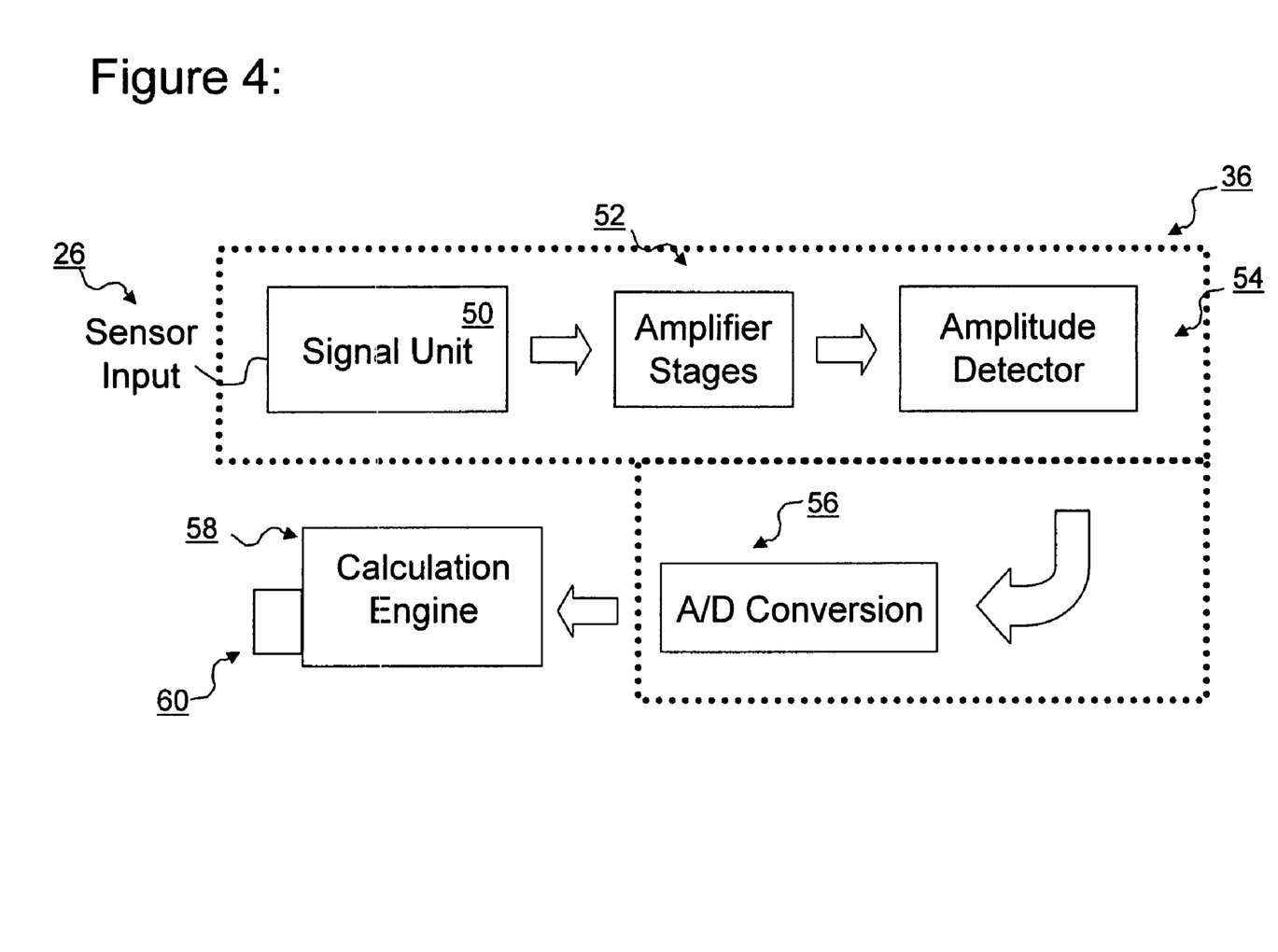
FIG. 4 is a schematic representation, in greater detail, of an embodiment useful in the systems of FIGS. 1-3.

Turning now to FIG. 4, an exemplary controller 36 and signal path therethrough is described in greater detail with respect to a single sensor input, with the understanding that it may be easily scaled for multiple sensors 26, 28, etc. As shown, a sensor 26 may be a conventional unidimensional analog detector configured to simply generate an electrical output corresponding to the intensity of signal 24 received thereby. For example, a sensor 26 may include signal detectors configured to detect the type of signal 24, e.g., IR, Visible Light, RF, ultrasonic, audible sonic, etc. Sensor 26 thus provides an output signal having a frequency which corresponds to the predetermined frequency (e.g., the pulse rate) of signal 24.

Controller 36 may include a signal discriminator unit 50, such as in the form of a conventional band pass filter or the like, which recognizes and passes signals of the predetermined frequency to an optional amplifier 52, and/or to an amplitude detector 54. Once the amplitude of the signal has been determined by detector 54, this information may be sent to an optional A/D converter 56 to digitize the analog amplitude information. Although analog amplitude may be processed to calculate the position of transmitter device 22, in many applications it may be preferable to use the digital output generated by A/D converter 56.

The digitized amplitude information may be easily processed by a calculation engine 58, e.g., in the form of digital logic embodied in hardware and/or software. Engine 58 may be disposed within controller 36, may be a discrete device, or alternatively, may be incorporated within the data consumer (e.g., computer 40, FIG. 1).

Calculation engine 58 uses the known locations of each of the sensors 26, 28, etc., in combination with the amplitudes of the signals received therefrom, to calculate the position of transmitter device 22. In this regard, the amplitude of the received signals may be correlated to a distance, such as by comparison to a lookup table stored within or coupled to engine 58. Those skilled in the art will recognize that once distances from device 22 to three or more distinct, known locations are determined, one may easily calculate the 3-D position of the device using conventional trigonometric calculations such as triangulation or trilateration. In this regard, trilateration is desired in many embodiments since it provides a direct 3-D position, e.g., without having to first calculate a 2-D position and then map that position to the third dimension.

Moreover, this approach lends itself to convenient scaling for improved accuracy, simply by increasing the number of sensors. Those skilled in the art will recognize that oversampling by using more than three sensors for each positional dimension's calculation tends to enhance accuracy. Such oversampling using multiple sensors allows for round-off corrections in raw measurements.

The 3-D position information may then be used in nominally any desired manner by the data consumer. For example, in an exemplary embodiment, calculation engine 58 may reside within controller 36. The controller may then format the 3-D position information according to a protocol, such as the conventional USB protocol, and output the information to computer 40 via an output (e.g., USB) port(s) 60.

The data consumer (e.g., computer 40), may then use the 3-D position information as desired, such as to move a virtual object or character within a virtual 3-D environment. Potential applications for these embodiments may include virtual reality gaming, or stereoscopic computer modeling applications such as those used in drug discovery, data visualization, handheld measurement and input, and the like.

Figure 5:
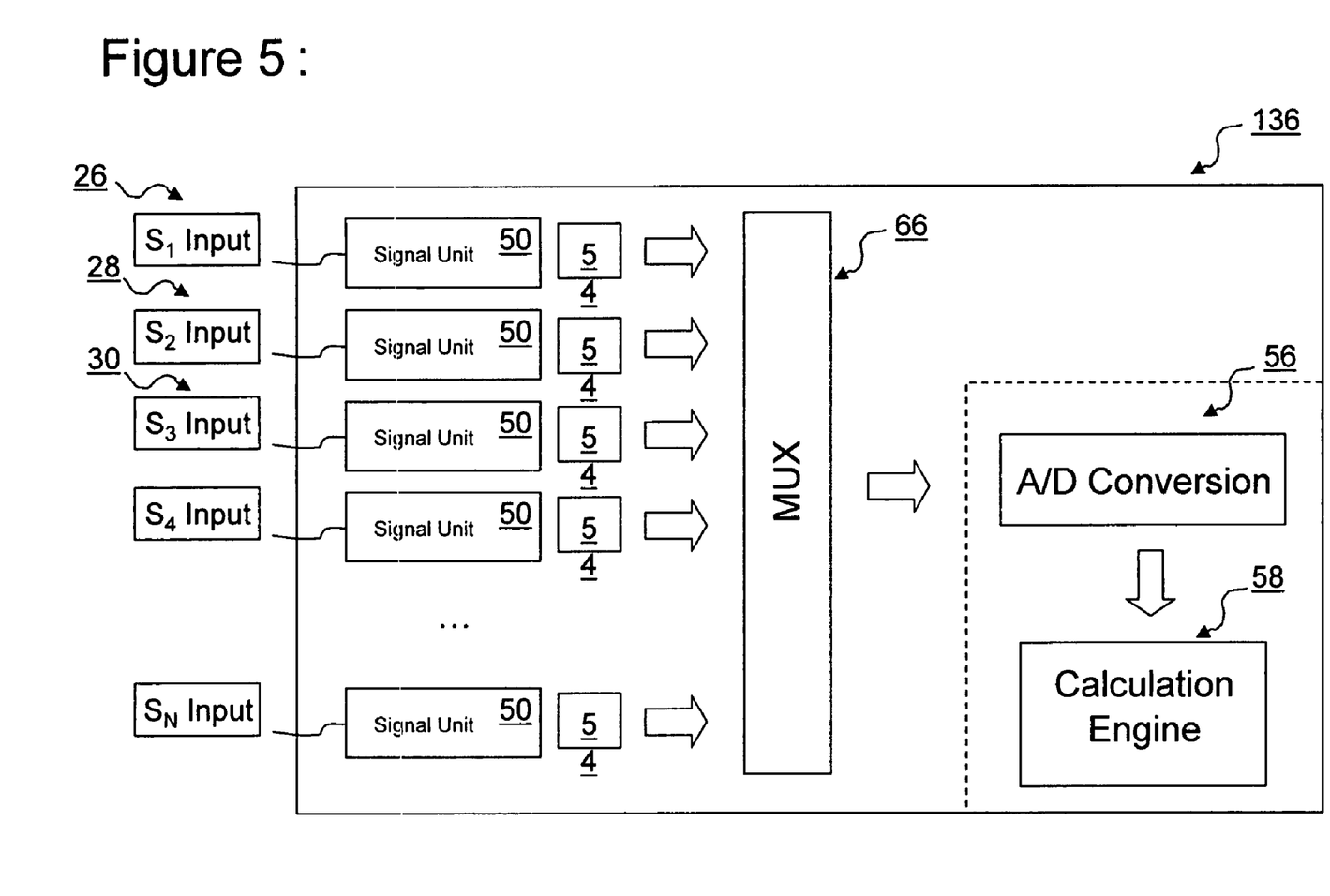
FIGS. 5-10 are schematic representations of various alternate embodiments of the subject invention.

Referring now to FIGS. 5-10, alternate embodiments of various aspects of the invention are shown and described. As shown in FIG. 5, signal detection unit 136 may include multiple instances of signal discriminator unit 50, each respectively configured to receive output from sensors 26, 28, etc. Each discriminator unit 50 may be coupled to an amplitude detector 54 and optionally, an amplifier 52 (FIG. 4). Signal detection unit 136 may also include a multiplexer to combine the signals from the various sensors in a known manner, and to send the combined signal to optional A/D converter 56 and to calculation engine 58. As discussed hereinabove, although calculation engine 58 is shown as disposed within the signal detection unit (e.g., controller) of the various embodiments disclosed herein, it may alternatively be disposed separately therefrom, such as shown in phantom, and/or within a data consumer such as computer 40 (FIG. 1), etc., without departing from the spirit and scope of the present invention.

Figure 6:
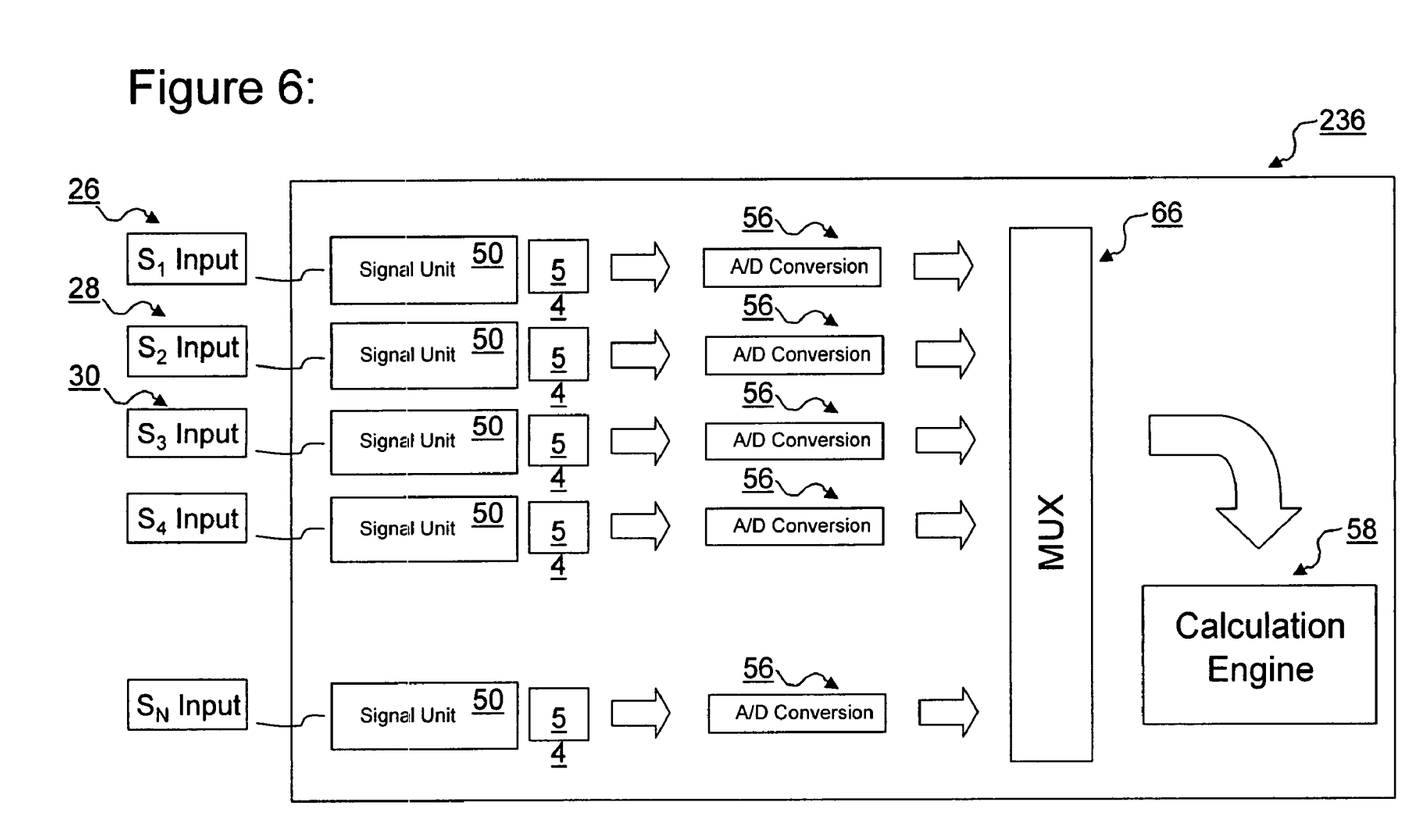
Figure 7:
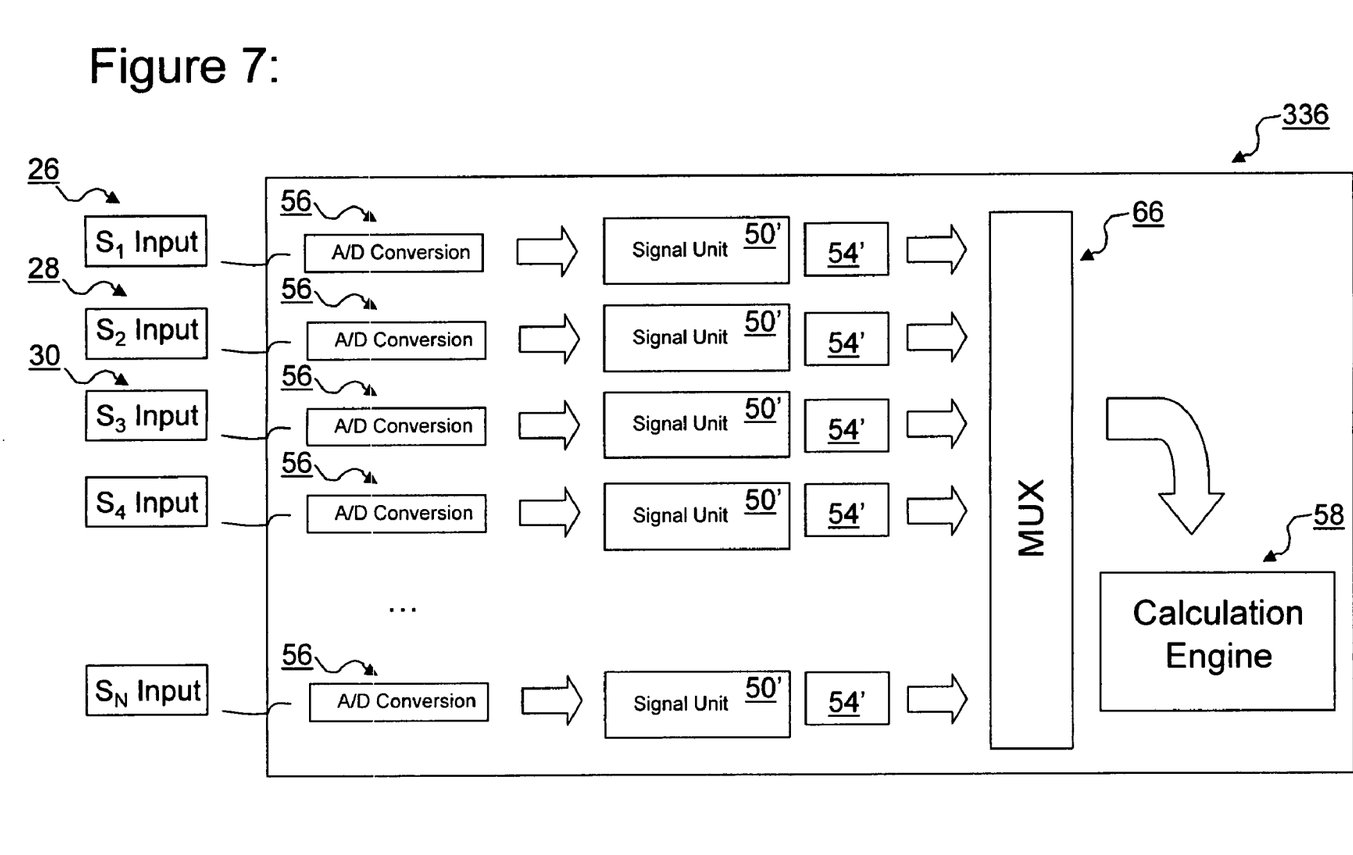

As shown in FIG. 6, signal detection unit 236 is similar to unit 136, but includes an array of A/D converters 56 disposed upstream of multiplexer 66. Signal detection unit 336 of FIG. 7 moves the A/D converters still further upstream, i.e., upstream of signal units and amplitude detectors 50', 54'. Those skilled in the art will recognize that signal units 50' and detectors 54' are substantially similar to units 50 and detectors 54, but are configured to operate with digital, rather than analog signals.

Figure 8:
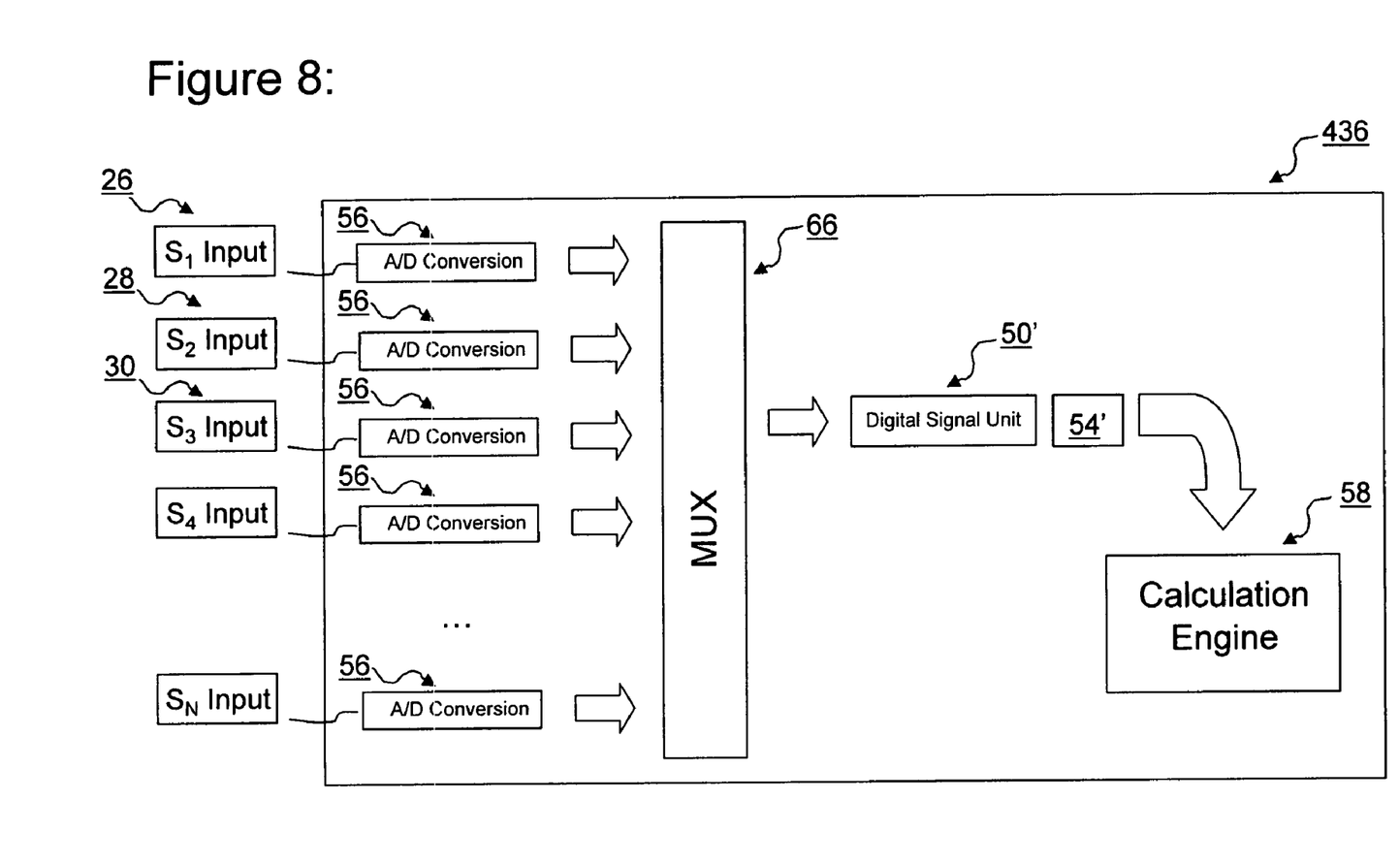
Figure 9:
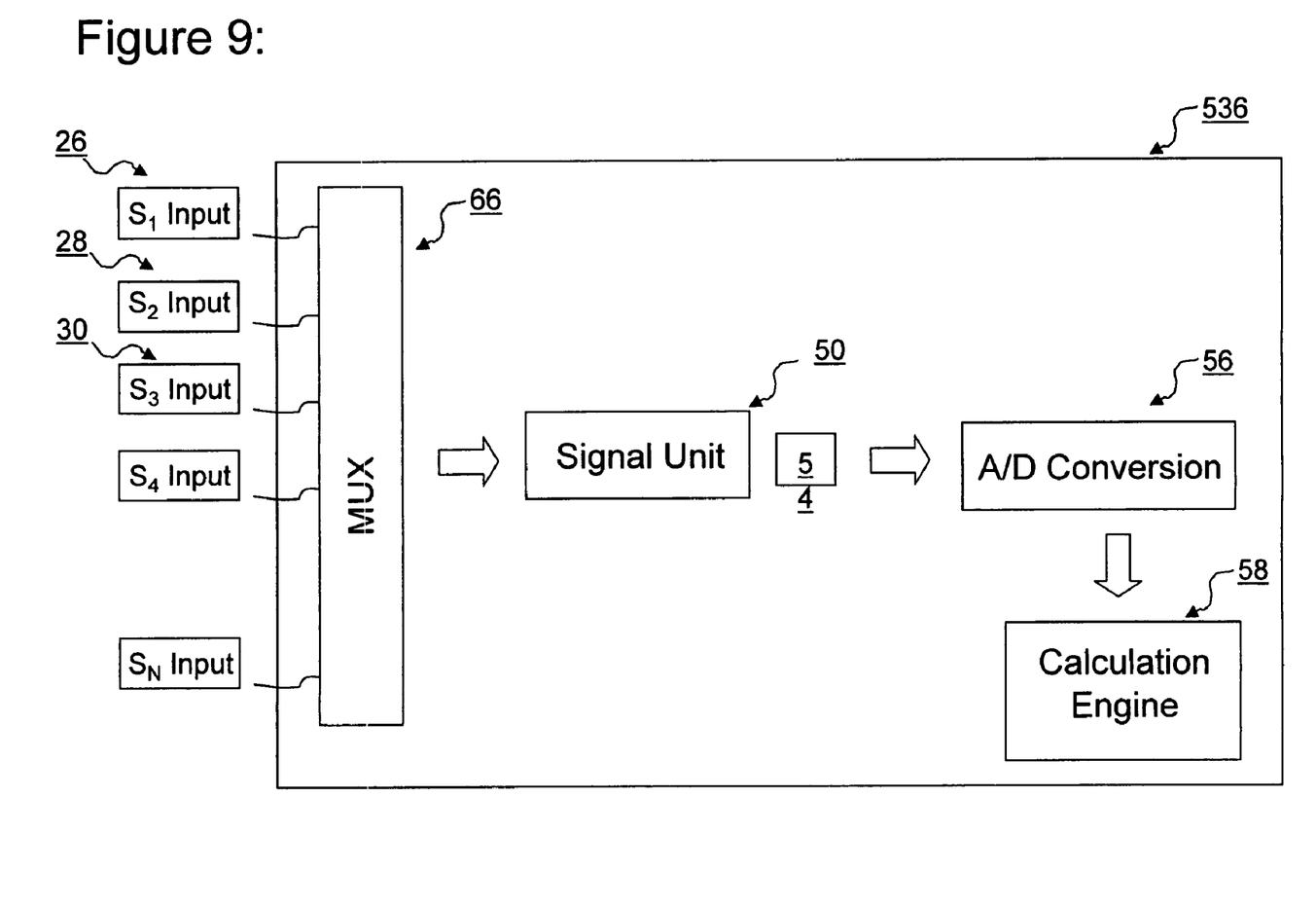

As shown in FIG. 8, detection unit 436 is substantially similar to unit 336 (FIG. 7), with multiplexer 66 moved upstream of signal unit 50' and amplitude detector 54'. This modification tends to simplify the overall configuration by effectively eliminating the need for multiple instances of signal units and detectors as shown.

Figure 10:
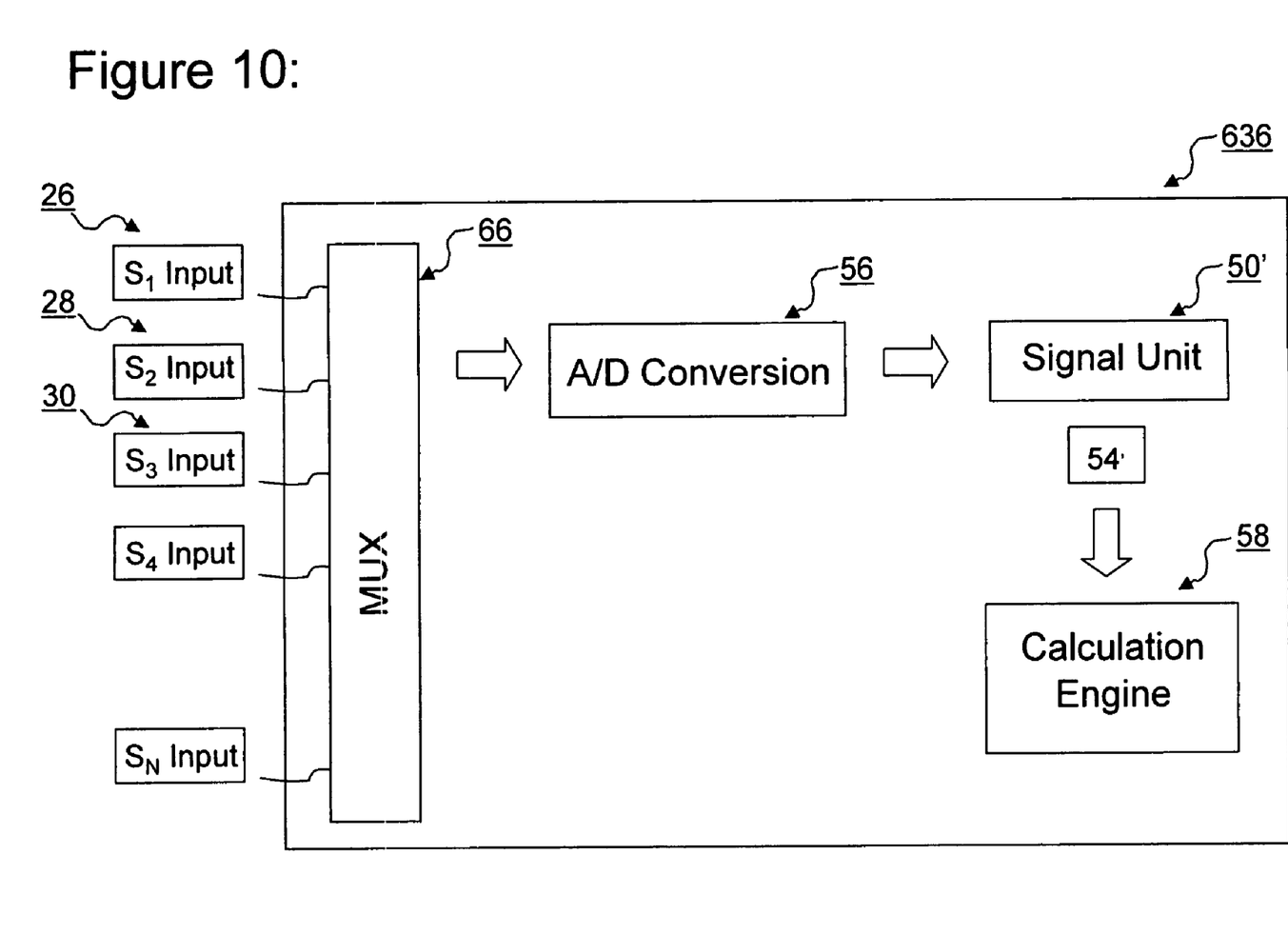

Detection unit 536 (FIG. 9) is further simplified by placement of multiplexer 66 upstream of the remaining elements thereof. This configuration may thus use only a single signal unit 50, amplitude detector 54, A/D Converter 56 and calculation engine 58. Detection unit 636 of FIG. 10 is a variant of unit 536, which places A/D Converter 56 upstream of digital signal unit 50' and amplitude detector 54'. Additional alternatives that would be evident to one skilled in the art in light of this disclosure, involve repositioning of various circuit and computational elements, alternative transmitters and sensors, and the like.

The following illustrative examples are intended to demonstrate certain aspects of the present invention. It is to be understood that these examples should not be construed as limiting.

EXAMPLES

Example 1

Figure 11:
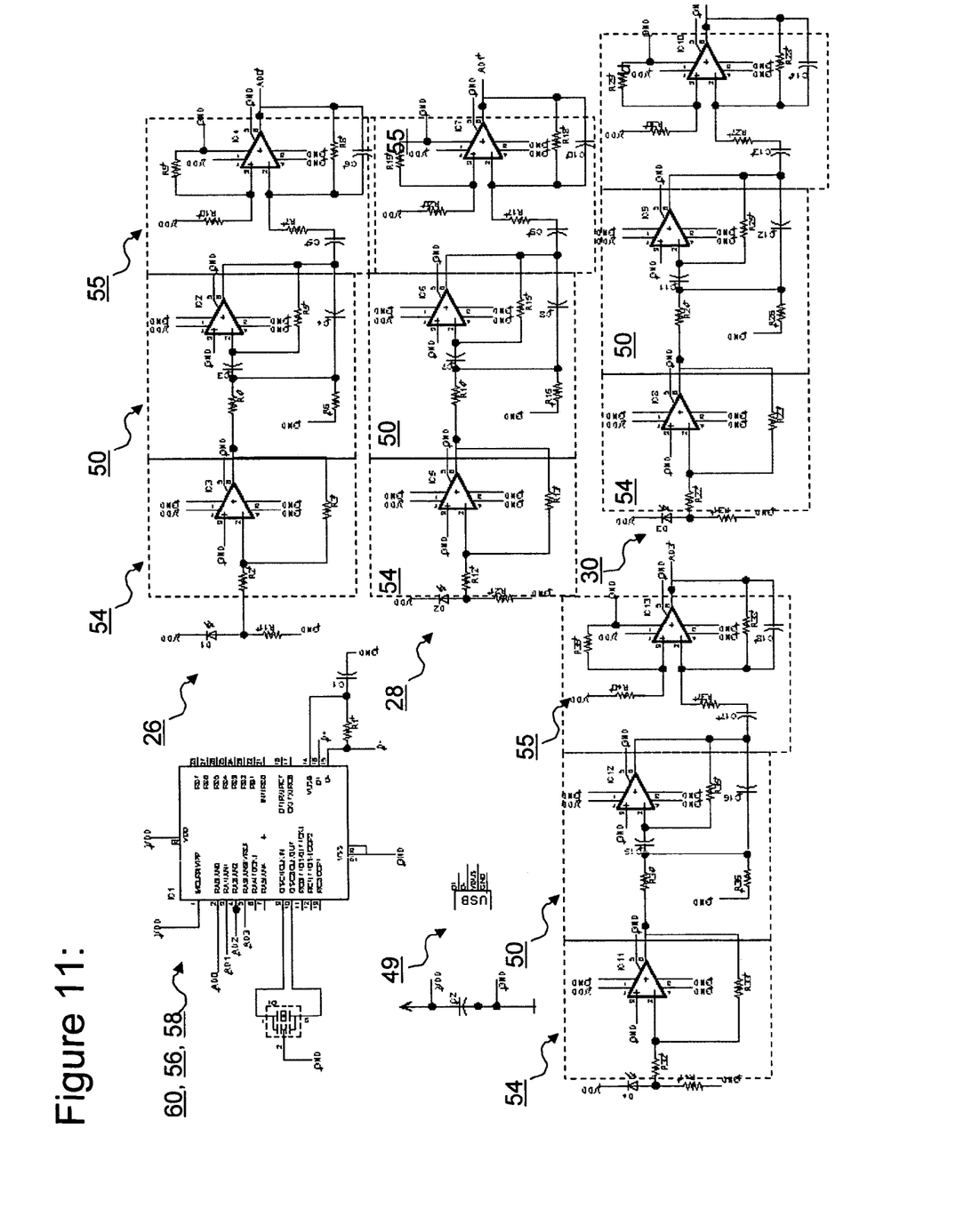
FIG. 11 is a schematic view of an exemplary circuit diagram of an embodiment of the invention.

Referring now to FIG. 11, an exemplary transmitter device 22 includes a wand configured to emit a pulsed IR multidirectional signal 24 in a manner similar to that of a conventional television remote control. Sensors 26, 28, 30, etc., are simple IR photo-diodes.

Upon receipt of IR signals from wand, the diodes generate an output which is fed to an amplifier circuit, 54, followed by a signal unit circuit, 50, which includes a simple bandpass filter in the embodiment shown, and is subsequently fed to an integrator circuit 55 to generate a steady output signal that correlates to the transmitter's distance from the sensor.

The signals from the integrator circuit 55 are fed to pins 2 through 5 of the microprocessor, are then digitized, processed, and outputted from the processor at USB terminals 14-16, which may then be coupled to a USB port of a data consumer (e.g., computer 40, FIG. 1, gaming console 42, FIG. 2, etc.). These signals may be outputted directly and de-multiplexed by the data consumer, e.g., via USB pins 14-16, using a compatible driver, in this case the USB 1.1 protocol. Alternatively, the microprocessor may be configured as multiplexer 66 and calculation engine 58, so that the signals are digitized, processed, and so the 3-D position of transmitter device 22 is calculated, e.g., using conventional trilateration as discussed hereinabove. This position data may be outputted via the USB pins to facilitate use by the data consumer nominally without any further calculations. The position data may be outputted in nominally any form usable by the data consumer. For example, the data may be or may not be transformed into alternatives from USB, raw (muxed or de-muxed, as discussed hereinabove), or in coordinate data form, formatted as RS232 serial data, Controller Area Network (CAN), IEEE 1394, or similar communications protocols, or even as PWM (pulse width modulated) signaling for direct or, via further integration, analog output.

Embodiments of the present invention thus efficiently determine the 3-D position information in a direct manner, for improved simplicity and accuracy relative to prior approaches.

In light of the foregoing, those skilled in the art should recognize that multiple transmitting devices 22 may be used in the same area (e.g., within a computer lab), or with the same data consumer, without departing from the spirit and scope of the present invention. This may be accomplished simply by providing each transmitting device with a unique pulse rate, transmission frequency, and/or other suitable modulation scheme known to those skilled in the art. For example, each device 22 may utilize a modified RFID tag approach, in which each device has its own digital tag to distinguish it from others.

In the preceding specification, the invention has been described with reference to specific exemplary embodiments thereof. It will be evident that various modifications and changes may be made thereunto without departing from the broader spirit and scope of the invention as set forth in the claims that follow. The specification and drawings are accordingly to be regarded in an illustrative rather than restrictive sense.

Having thus described the invention, what is claimed is:

1. A three-dimensional position and motion telemetry computer input apparatus, comprising:
   a user-engagable movable element;
   a combination of at least one transmitter and at least one signal detector configured to repeatedly transmit and receive signals between said movable element and at least three mutually distinct spaced locations;
   a discriminator coupled to said at least one signal detector, configured to repeatedly distinguish said signals from other signals;
   said at least one signal detector configured to repeatedly detect in real time, characteristics of said signals corresponding to distances between said movable element and said at least three mutually distinct spaced locations;
   an analog to digital converter configured to repeatedly digitize, in real-time, signal data corresponding to the distances detected by said at least one signal detector;
   a controller configured to repeatedly capture, in real-time, the digitized signal data;
   a calculation engine configured to repeatedly determine the 3-D position of said movable element, in real-time, by trilaterating said captured signal data; and
   at least one output port coupled to said calculation engine, said output port configured to repeatedly transmit the 3-D position of said movable element to a computer in real-time.

2. A three-dimensional position and motion telemetry computer input apparatus, comprising:
   a user-engagable movable element;
   a combination of at least one transmitter and at least one signal detector configured to repeatedly transmit and receive signals between said movable element and at least three mutually distinct spaced locations;
   said at least one signal detector configured to repeatedly detect in real-time, characteristics of said signals corresponding to distances between said movable element and said at least three mutually distinct spaced locations;
   a calculation engine configured to repeatedly determine, in real-time, the 3-D position of said movable element using said signal characteristics; and
   at least one output port coupled to said calculation engine, to repeatedly in real-time transmit the 3-D position of said movable element to a data consumer.

3. The apparatus of claim 2, wherein said at least one signal detector comprises a unidirectional signal detector disposed at each of said at least three mutually distinct spaced locations.

4. The apparatus of claim 3, wherein said at least one transmitter comprises a transmitter disposed integrally with said movable element.

5. The apparatus of claim 2, wherein said signal characteristics comprise signal amplitude.

6. The apparatus of claim 2, comprising a controller configured to repeatedly capture data corresponding to said distances, in real-time, and to forward said captured data to said calculation engine.

7. The apparatus of claim 2, comprising a discriminator coupled to said at least one signal detector, said discriminator configured to distinguish said signals from other signals.

8. The apparatus of claim 7, wherein said discriminator comprises at least one band pass filter tuned to the frequency of the transmitted signals.

9. The apparatus of claim 8, wherein said at least one signal detector generates electrical outputs corresponding to the amplitude of the transmitted signals passing through said band pass filter.

10. The apparatus of claim 2, comprising at least one analog to digital (A/D) converter configured to digitize electrical outputs corresponding to the signal characteristics detected by said at least one signal detector.

11. The apparatus of claim 2, wherein said at least one transmitter is configured to transmit a pulsed optical electromagnetic (EM) signal.

12. The apparatus of claim 11, wherein said pulsed optical EM signal comprises an amplitude modulated signal.

13. The apparatus of claim 11, wherein said pulsed optical EM signal comprises a frequency modulated signal.

14. The apparatus of claim 2, wherein said at least one signal detector comprises an analog signal detector.

15. The apparatus of claim 2, wherein said at least one signal detector is selected from the group consisting EM and sonic detectors, and combinations thereof.

16. The apparatus of claim 3, comprising a set of greater than 3 unidimensional wireless signal detectors, wherein said calculation engine is configured to determine the 3-D position of said movable element using captured data from said greater than 3 unidimensional wireless signal detectors.

17. The apparatus of claim 3, comprising a multiplexer configured to multiplex outputs of said signal detectors.

18. The apparatus of claim 17, wherein said outputs travel in a downstream direction from said signal detectors to said output port, and said multiplexer is disposed upstream of a signal amplitude detector.

19. The apparatus of claim 17, wherein said outputs travel in a downstream direction from said signal detectors to said output port, and said multiplexer is disposed downstream of a signal amplitude detector.

20. The apparatus of claim 2, comprising a plurality of movable elements operating with mutually distinct encoded signals.

21. The apparatus of claim 20, wherein said mutually distinct encoded signals comprise mutually distinct signal pulse rates.

22. A method for inputting real-time three-dimensional position and motion telemetry data to a computer, the method comprising:
- (a) providing a user engagable movable element;
- (b) transmitting and receiving repeatedly in real-time, signals between the movable element and at least three mutually distinct locations;
- (c) detecting repeatedly in real-time, characteristics of said signals corresponding to distances between the movable element and the at least three mutually distinct spaced locations;
- (d) determining the 3-D position of said movable element, repeatedly in real-time, using the signal characteristics; and
- (e) transmitting the 3-D position, repeatedly in real-time, of the movable element to a data consumer.

23. The method of claim 22, wherein said transmitting and receiving (b) comprises transmitting and receiving an encoded wireless signal selected from the group consisting of EM and sonic signals, and combinations thereof.

* * * * *